United States Patent Office 2,942,007
Patented June 21, 1960

2,942,007
PRODUCTION OF ALPHA-METHYLSTYRENE OXIDES

William D. Griffin, Morristown, and George G. Joris, Madison, N.J., assignors to Allied Chemical Corporation, a corporation of New York No Drawing. Filed Mar. 14, 1956, Ser. No. 571,387

7 Claims. (Cl. 260—348.5)

This invention relates to process for production of alpha-methylstyrene oxides of formula:

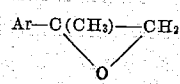

wherein Ar represents a monocyclic aromatic nucleus.

More particularly, our invention involves oxidation of an alpha-methylstyrene in liquid phase by elemental oxygen to the corresponding alpha-methylstyrene oxide.

Alpha-methylstyrenes are obtained as by-products of manufacture of phenols from isopropyl benzene hydroperoxides. Economical disposal of an alpha-methylstyrene by-product accordingly contributes to the economy of the phenol production.

According to prior proposals, an alpha-methylstyrene in liquid phase, in presence of metal oxides such as vanadium or manganese oxides, may be oxidized by elemental oxygen to the corresponding phenyl methyl ketone and formaldehyde according to the equation:

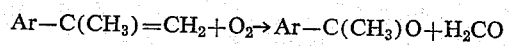

It would be desirable to obtain products with wider markets than the above methyl aryl ketones.

Alpha-methylstyrene oxides have potentially wide use as components of glycol ester type resins. We have now found that under suitable conditions an alpha-methylstyrene upon oxidation in liquid phase with elemental oxygen, e.g. oxygen of air, yields important quantities of the corresponding alpha-methylstyrene oxide with acetophenone or a substituted acetophenone as a valuable second product. Our conditions comprise temperatures in the range between about 60° C. and about 130° C. and presence of at least one basic alkali metal compound or alkaline earth metal compound, i.e. a compound which reacts with an acid to form a salt of an alkali metal or alkaline earth metal in which said metal is the cation. Particularly useful basic compounds, we have found, are sodium hydroxide, sodium carbonate, and calcium carbonate, present in solid form singly or in admixture.

The following examples are illustrative of our invention. In the examples unsubstituted alpha-methylstyrene and para-methyl-alpha-methylstyrene are oxidized, but the invention is not restricted thereto. Other substituted alpha-methylstyrenes such as ortho- and meta-methyl alpha-methylstyrenes; ortho-, meta and para-chloro alpha-methylstyrenes; para-fluoro alpha-methylstyrene and the like can also be oxidized in similar manner to the corresponding alpha-methylstyrene oxides.

Example 1

(a) Alpha-methylstyrene was heated under a reflux condenser at 80° C., and 0.2% by weight each of powdered commercial sodium carbonate and Atomite (a finely divided commercial calcium carbonate) were added. Air was bubbled through the mixture at a rate of 100 liters per hour per liter of reaction mixture, which was sufficient to keep the catalyst powders in suspension. The oxidation was continued for 50 hours. The reaction product thus produced contained, by weight, 18% of alpha-methylstyrene oxide, 9% of acetophenone, and 7% of high-boiling residue. The balance of the reaction product was unreacted alpha-methylstyrene. The alpha-methylstyrene oxide could be recovered from the oxidation products by fractional distillation, e.g. at 67° C./7 mm., 91° C./23 mm., or 108° C./46.5 mm.

(b) Washing the alpha-methylstyrene with dilute aqueous sodium hydroxide solution before carrying out oxidation by the above procedure, or use of 1% by weight each of sodium carbonate and calcium carbonate under otherwise the conditions of the above example, each produced after 50 hours of oxidation a reaction product mixture containing, by weight, about 28% alpha-methylstyrene oxide, about 17% of acetophenone, and about 11% of high-boiling residue, with the balance being unreacted alpha-methylstyrene. Similar results to those just cited are obtained employing 2% by weight of either sodium or calcium carbonate powder singly as catalyst.

Example 2

When 0.2% by weight of solid sodium hydroxide in chip form was used as basic compound instead of the mixed carbonates under otherwise the same procedure used in Example 1(a), the reaction product, after 50 hours of oxidation, contained 27% alpha-methylstyrene oxide, 17% acetophenone and 6% high-boiling residue, and the balance was unreacted alpha-methylstyrene. The alpha-methylstyrene oxide could be recovered from the product mixture by fractional distillation.

Example 3

Para-methyl-alpha-methylstyrene was prepared by dehydration of dimethyl-para-tolyl carbinol, the latter being formed by oxidation of para-cymene. Para-cymene was oxidized at 105° C. catalyzed by 1% sodium hydroxide, with dimethyl-para-tolyl carbinol being the major product. The carbinol was concentrated by distillation, and was dehydrated at 95° C. using 0.64% sulfur dioxide as catalyst. This reaction product was fractionated, with para-methyl-alpha-methylstyrene being recovered as a cut boiling at 93–95° C. at 34 mm. pressure.

A 30 ml. sample of the resulting para-methyl-alpha-methylstyrene was put in a conical flask with thermometer, reflux condenser, and air bubbler, with 0.3 gram each of powdered soda ash and Atomite (commercial calcium carbonate) as catalyst. A temperature of 80° C. was maintained by immersing the conical flask in a thermo-regulated oil bath. Air was bubbled in through the air bubbler at a rate of 10 liters per hour, the air stream serving to effect oxidation as well as catalyst dispersion. Samples were removed periodically, for analysis by infrared spectrometry. After 27 hours, the reaction mixture contained about 2% para-methyl-alpha-methylstyrene oxide. After 46 hours the run was terminated. Analysis of the product showed the approximate composition in weight percent to be as follows: 18% para-methylalpha-methylstyrene oxide, 18% para-methylacetophenone, 8% of a carbonyl compound, and 8% of a carbinol, leaving about 48% unreacted para-methyl-alpha-methylstyrene.

The basic compounds employed as catalysts in our process are used in small quantities such as 0.01%–10% by weight. The minimum amounts of these compounds which should be used are amounts effective to accelerate the rate of absorption of oxygen by the reaction mixture as compared to its absorption rate under like conditions with no catalyst used. Preferably the basic compound is used in solid, finely divided form and substantially anhydrous conditions are maintained in the reaction mixture, whereby any hydrolysis reactions are avoided, and caking of the catalyst powders is prevented.

We claim:
1. Process for oxidizing an alpha-methylstyrene of the group consisting of alpha - methylstyrene, ortho - methyl - alpha - methylstyrene, meta - methyl - alpha - methylstyrene, para - methyl - alpha - methylstyrene, ortho - chloro - alpha - methylstyrene, meta - chloro - alpha - methylstyrene, para - chloro - alpha - methylstyrene, and para - fluoro - alpha - methylstyrene, which process comprises contacting said alpha-methylstyrene with elemental oxygen in liquid phase at temperatures in the range between about 60° C. and about 130° C. in presence of a catalyst consisting essentially of at least one basic compound of the group consisting of sodium hydroxide, sodium carbonate and calcium carbonate; and recovering a reaction product containing important quantities of alpha-methylstyrene oxide corresponding to the starting alpha-methylstyrene.

2. Process as defined in claim 1, wherein unsubstituted alpha-methylstyrene is oxidized; the basic compound is in solid, finely divided form in amounts in the range between 0.01% and 10% by weight; substantially anhydrous conditions are maintained in the reaction mixture; and elemental oxygen is supplied as oxygen of air.

3. Process as defined in claim 2 wherein the basic compound is sodium hydroxide.

4. Process as defined in claim 2, wherein the basic compound is sodium carbonate.

5. Process as defined in claim 2, wherein the basic compound is calcium carbonate.

6. Process as defined in claim 2, wherein the basic compound is a mixture of sodium carbonate and calcium carbonate.

7. Process as defined in claim 2, wherein the basic compound is at least one member of the group consisting of hydroxides and carbonates of alkali metals and alkaline earth metals.

References Cited in the file of this patent
UNITED STATES PATENTS

| | | |
|---|---|---|
| 2,052,195 | Schneider | Aug. 25, 1936 |
| 2,197,101 | Eaglesfield | Apr. 16, 1940 |
| 2,447,400 | Emerson | Aug. 17, 1948 |
| 2,545,870 | Baker | Mar. 20, 1951 |
| 2,632,774 | Conner | Mar. 25, 1953 |
| 2,741,623 | Millidge | Apr. 10, 1956 |

OTHER REFERENCES

Barnes et al.: J.A.C.S., vol. 72, pp. 210–215.
Abere et al.: J. Applied Chem., vol. 1, pp. 363–370.